US012078056B2

(12) United States Patent
Fouda et al.

(10) Patent No.: US 12,078,056 B2
(45) Date of Patent: Sep. 3, 2024

(54) ELECTROMAGNETIC SYSTEMS FOR RESERVOIR MONITORING

(71) Applicant: Halliburton Energy Services, Inc., Houston, TX (US)

(72) Inventors: Ahmed Elsayed Fouda, Pearland, TX (US); Michael Christie, Westhill (GB); Kenneth Liang, Houston, TX (US); Christopher Michael Jones, Houston, TX (US); Sriram Srinivasan, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 18/077,392

(22) Filed: Dec. 8, 2022

(65) Prior Publication Data

US 2024/0191619 A1 Jun. 13, 2024

(51) Int. Cl.
*E21B 47/13* (2012.01)
*E21B 17/02* (2006.01)
*H04B 5/79* (2024.01)

(52) U.S. Cl.
CPC .......... *E21B 47/13* (2020.05); *E21B 17/0283* (2020.05); *H04B 5/79* (2024.01)

(58) Field of Classification Search
CPC .... E21B 47/13; E21B 17/0283; H04B 5/0037
See application file for complete search history.

(56) References Cited

U.S. PATENT DOCUMENTS

| | | | |
|---|---|---|---|
| 5,397,985 A * | 3/1995 | Kennedy | G01B 7/10 346/33 P |
| 6,426,917 B1 | 7/2002 | Tabanou et al. | |
| 6,788,065 B1 | 9/2004 | Homan et al. | |
| 6,864,801 B2 | 3/2005 | Tabanou et al. | |
| 9,715,024 B2 | 7/2017 | Samson et al. | |
| 10,598,003 B2 | 3/2020 | Dashevsky et al. | |
| 11,016,209 B2 | 5/2021 | Wilson et al. | |
| 11,156,078 B2 * | 10/2021 | Clarkson | E21B 47/13 |
| 2009/0151932 A1 | 6/2009 | Hall et al. | |

(Continued)

OTHER PUBLICATIONS

International Search Report & Written Opinion; PCT/US2022/053446-; mailed Aug. 29, 2023.

*Primary Examiner* — Amine Benlagsir
(74) *Attorney, Agent, or Firm* — NOVAK DRUCE CARROLL LLP

(57) ABSTRACT

Described herein are systems and techniques for monitoring substances that are injected into an Earth formation whether that be CO2 from a carbon capture and storage (CCS) process, or water or steam injected for an enhanced oil recovery (EOR) process. Components located on an outside of a wellbore casing may be electrically isolated from components located on the inside of the wellbore casing. Data and/or power may be transferred through the wellbore casing wirelessly in order to increase the reliability of a data collection system because the need for wires to be placed on the outside surface of a wellbore casing is eliminated. The components located on the outside of the casing may receive electromagnetic (EM) or transmit EM fields as part of a system that collects data about substances that are injected into Earth formations during a CCS or EOR process.

20 Claims, 11 Drawing Sheets

(56) References Cited

U.S. PATENT DOCUMENTS

| | | | |
|---|---|---|---|
| 2016/0168975 A1* | 6/2016 | Donderici | G01B 7/10 |
| | | | 324/238 |
| 2016/0258284 A1 | 9/2016 | Bittar et al. | |
| 2017/0343694 A1* | 11/2017 | Kraft | G01V 3/08 |
| 2018/0230779 A1* | 8/2018 | Bridges | E21B 47/26 |
| 2018/0291729 A1* | 10/2018 | Wilson | E21B 47/13 |
| 2019/0309617 A1* | 10/2019 | Godager | E21B 47/092 |
| 2020/0270989 A1 | 8/2020 | Hagen | |
| 2021/0041591 A1* | 2/2021 | Riachentsev | G01V 3/28 |

* cited by examiner

ELECTROMAGNETIC SYSTEMS FOR RESERVOIR MONITORING

TECHNICAL FIELD

The present disclosure is generally directed to electromagnetic systems for reservoir monitoring. For example, aspects of the present disclosure are directed to improving the robustness of a wellbore sensing apparatus and using the wellbore sensing apparatus to monitor conditions of the wellbore.

BACKGROUND

When managing oil and gas drilling and production environments (e.g., wellbores, etc.) and performing operations in the oil and gas drilling and production environments, it is important to obtain measurements and other sensor data and details regarding Earth formations and conditions in the vicinity of a wellbore. Such data may be used to understand downhole conditions and help manage the wellbore and associated operations. For example, sensor data can be used to identify features within the Earth formations and whether the Earth formations are stable and being used in a controlled way. However, the downhole conditions and constraints can create significant challenges in deploying systems such as sensors and monitoring conditions downhole. Non-limiting illustrative examples of such conditions and constraints can include extreme temperatures, extreme pressures, space constraints, and complex mixtures of different elements, among others.

BRIEF DESCRIPTION OF THE DRAWINGS

In order to describe the manner in which the features and advantages of this disclosure can be obtained, a more particular description is provided with reference to specific implementations thereof which are illustrated in the appended drawings. Understanding that these drawings depict only exemplary implementations of the disclosure and are not therefore to be considered to be limiting of its scope, the principles herein are described and explained with additional specificity and detail through the use of the accompanying drawings in which.

DETAILED DESCRIPTION

Figure 1A:
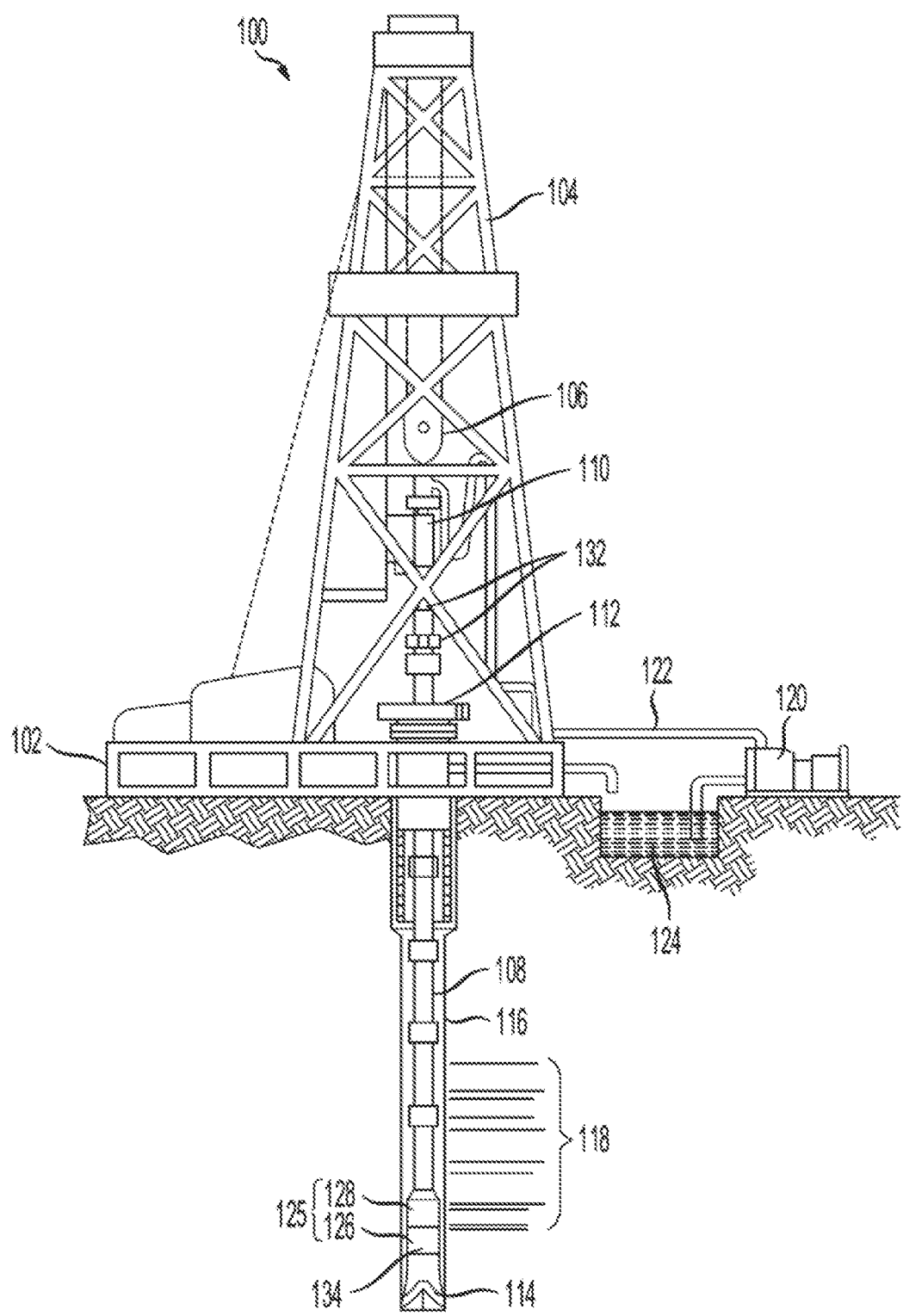
FIG. 1A is a schematic diagram of an example logging while drilling wellbore operating environment, in accordance with various aspects of the subject technology.

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the methods and apparatus described herein. However, it will be understood by those of ordinary skill in the art that the methods and apparatus described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the present disclosure.

Subsurface carbon capture and storage has the potential to substantially reduce net carbon dioxide emissions and help reduce overall global warming. The ability to continuously monitor CO2 in a capture reservoir can increase and/or ensure the safety and effectiveness of the subsurface carbon capture and storage process. Different physics can be used to monitor reservoirs including, for example and without limitation, seismic, gravity, and electromagnetics, among others. Using electromagnetic (EM) sensors to monitor a reservoir can provide the best tradeoff between the depth of investigation and resolution. Various EM monitoring technologies can be deployed in different topologies including, for example and without limitation, surface-to-surface topologies, surface-to-borehole topologies, borehole-to-surface topologies, and/or cross-borehole topologies. Surface-to-surface is limited in terms of depth of investigation and vertical resolution. In some cases, wires running on an outside of a wellbore casing can be implemented to provide power and data to one or more sensors deployed downhole (one or more downhole sensors). However, running wires on an outside of the casing poses reliability risks as the wires can be damaged by formation rock and fluids in a downhole environment outside of the casing and can increase the cost and complexity of deployment/completion. Thus, the downhole environment outside of the casing of a wellbore can create significant challenges in providing power and communication to downhole sensors, which can be used for reservoir monitoring as further described herein.

Described herein are systems, apparatuses, processes (also referred to as methods), and computer-readable media (collectively referred to as "systems and techniques") for monitoring conditions associated with materials that have been injected into the Earth. In some examples, the systems and techniques described herein can collect sensor data and use the sensor data to assess whether a carbon dioxide sequestering process is proceeding according to a CO2 sequestering rule that dictates that injected CO2 should be contained within a reservoir portion of Earth formations such that no more than a threshold amount of CO2 should escape out of the reservoir. Such a CO2 sequestering rule could dictate levels of CO2 stability within a reservoir, an injection rate of CO2, a CO2 injection pressure range, a temperature associated with injecting CO2, or may dictate that injected CO2 should not escape boundaries of an underground reservoir. Additionally or alternatively, the systems and techniques described herein can collect data indicative of areas were a hydraulic fracturing fluid is moving or has moved in Earth formations during a hydraulic fracturing process. In some aspects, the systems and techniques described herein can monitor the injection of CO2 into Earth formations and the stability of the CO2 injected into the Earth formations. In other examples, the systems and techniques described herein can be used to monitor other materials and/or elements injected into a formation accessible through a wellbore. For example, the systems and techniques described herein can monitor injections of steam, water, a solvent(s), and/or other materials and/or elements. In some cases, the injection of such materials and/or elements can be performed and/or monitored while the systems and techniques described herein performs hydraulic fracturing.

In some aspects, the systems and techniques described herein can monitor substances that are injected into an Earth formation over time. In some examples, the substances can include, without limitation, CO2 from a carbon capture and storage (CCS) process and/or water and/or steam injected for an enhanced oil recovery (EOR) process, among others. Components (e.g., sensors, computing devices, transmitters, receivers, transceivers, wires, mechanical tools, etc.) located on an outside of a wellbore casing may be electrically isolated from components (e.g., sensors, computing devices, transmitters, receivers, transceivers, wires, mechanical tools, etc.) located on the inside of the wellbore casing. Data and/or power may be transferred through the wellbore casing wirelessly in order to increase the performance and/or reliability of a data collection and evaluation system. The system and techniques described herein can eliminate the need for wires to be deployed on the outside or the outside surface of the wellbore casing where the wires are exposed and may potentially be damaged by sharp surfaces, elements/substances, and/or conditions in the ground (e.g., in an Earth formation located outside of the wellbore). The components located on the outside of the casing may receive electromagnetic (EM) fields and/or transmit electromagnetic (EM) fields as part of a system that collects data about substances that are injected into Earth formations during a CCS or EOR process.

Electromagnetic energy may be transmitted into an area of the Earth that is in the proximity of a wellbore using a first set of electrical/electronic components. A portion of the EM energy transmitted into the Earth may also be received by other components as EM signals by components such as electric field sensors, magnetic field sensors, or EM field sensors that are located outside of a wellbore casing implemented in a wellbore environment. Additionally or alternatively, galvanic devices attached to the wellbore casing may be used to receive or transmit EM signals. As further described below with respect to FIGS. 1A and 1B, a wellbore environment can include one or more components located within a wellbore casing and one or more components located outside of the wellbore casing. The component(s) located on the outside of the wellbore casing may include, for example and without limitation, one or more sensors that sense EM energy, one or more transmitters that transmit EM energy into an Earth formation in or within a threshold proximity to the wellbore environment. Power and/or data may be sent from a location within the wellbore environment, such as a downhole location or a surface location, through and/or across the wellbore casing. The power and/or data can be sent through and/or across the wellbore casing using one or more wireless energy and/or data transfer techniques such as, for example and without limitation, inductive coupling, capacitive coupling, acoustic coupling, and/or piezoelectric coupling. For example, the wellbore casing can be used as a waveguide to transmit acoustic signals through and/or across one or more sections of the wellbore casing. Data collected from such a system that includes EM transmitters and EM sensors may be used to identify the resistance or change resistance of a formation within the Earth.

Resistivity of Earth formations is highly sensitive to fluid (e.g., water, steam, or CO2) saturation. EM tic data can be acquired and processed to monitor the progression of an injected substance over time. This acquired EM data may be processed to generate images that visually show the progression of the injected substance. Such visualizations may show areas where CO2 or other injected materials have moved/progressed into areas of an Earth formation. For example, an area where cracks in the Earth are used as a CO2 sequestration reservoir may be depicted as that are is filled with CO2. Evaluations made on the acquired EM data may identify whether resistivities within an underground reservoir or Earth formations that surround that formation are increasing or decreasing. Typically, CO2 and steam have higher resistivities than the formation fluids in place, such as oil, water, mixtures of fluids and any other substances/materials (e.g., mixtures of water, oil, gas, etc.), etc. Therefore, the CO2 and/or the steam can cause an increase in the formation resistivity. On the other hand, salt water that may be used in waterflood injections typically results in a decrease in the formation resistivity. Increasing or decreasing resistivities within a reservoir may indicate that the reservoir is being filled with an injected substance. The filling of an underground reservoir with CO2 may be identified from increased resistivity of the reservoir and such an observation may indicate that the CO2 is progressing into the reservoir as planned. Increasing or decreasing resistivities of areas that surround an underground reservoir may indicate that the reservoir has reached a maximum capacity or is saturated. For example, when additional fluid (e.g., water, steam, or CO2) is injected into the reservoir results in a least a portion of the fluid being forced into the areas that surround the underground reservoir, the reservoir may be judged as being full.

The systems and techniques described herein can be used to monitor CO2 reservoirs in wellbore environments having one or more topologies such as, for example, surface-to-borehole, borehole-to-surface, and borehole-to-borehole, among others. In some cases, the systems and techniques described herein can implement an integrated system including surface-to-borehole, borehole-to-surface, and/or borehole-to-borehole EM sensors. The EM sensors downhole can be powered and can communicate wirelessly through the casing to one or more receiver devices such as, for example, one or more telemetry stations affixed to a tubing deployed in the wellbore environment. In some cases, power and communication lines can be implemented to run on an outside portion of the tubing (e.g., in an annulus) and can therefore be protected from abrasive exposure to the formation rock and fluids.

Examples of the systems and techniques described herein are illustrated in FIG. 1 through FIG. 10 and described below.

FIG. 1A is a schematic diagram of an example logging while drilling wellbore operating environment, in accordance with various aspects of the subject technology. The drilling arrangement shown in FIG. 1A provides an example of a logging-while-drilling (commonly abbreviated as LWD) configuration in a wellbore drilling scenario 100. The LWD configuration can incorporate sensors (e.g., EM sensors, seismic sensors, gravity sensor, image sensors, etc.) that can acquire formation data, such as characteristics of the formation, components of the formation, etc. For example, the drilling arrangement shown in FIG. 1A can be used to gather formation data through an electromagnetic imager tool (not shown) as part of logging the wellbore using the electromagnetic imager tool. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As drill bit 114 extends into the wellbore 116 through the formations 118 and as the drill string 108 is pulled out of the wellbore 116, logging tools 126 collect measurements relating to various formation properties as well as the orientation of the tool and various other drilling conditions. The logging tool 126 can be applicable tools for collecting measurements in a drilling scenario, such as the electromagnetic imager tools described herein. Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

The bottom-hole assembly 125 may also include a telemetry sub 128 to transfer measurement data to a surface receiver 132 and to receive commands from the surface. In at least some cases, the telemetry sub 128 communicates with a surface receiver 132 by wireless signal transmission (e.g., using mud pulse telemetry, EM telemetry, or acoustic telemetry). In other cases, one or more of the logging tools 126 may communicate with a surface receiver 132 by a wire, such as wired drill pipe. In some instances, the telemetry sub 128 does not communicate with the surface, but rather stores logging data for later retrieval at the surface when the logging assembly is recovered. In at least some cases, one or more of the logging tools 126 may receive electrical power from a wire that extends to the surface, including wires extending through a wired drill pipe. In other cases, power is provided from one or more batteries or via power generated downhole.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
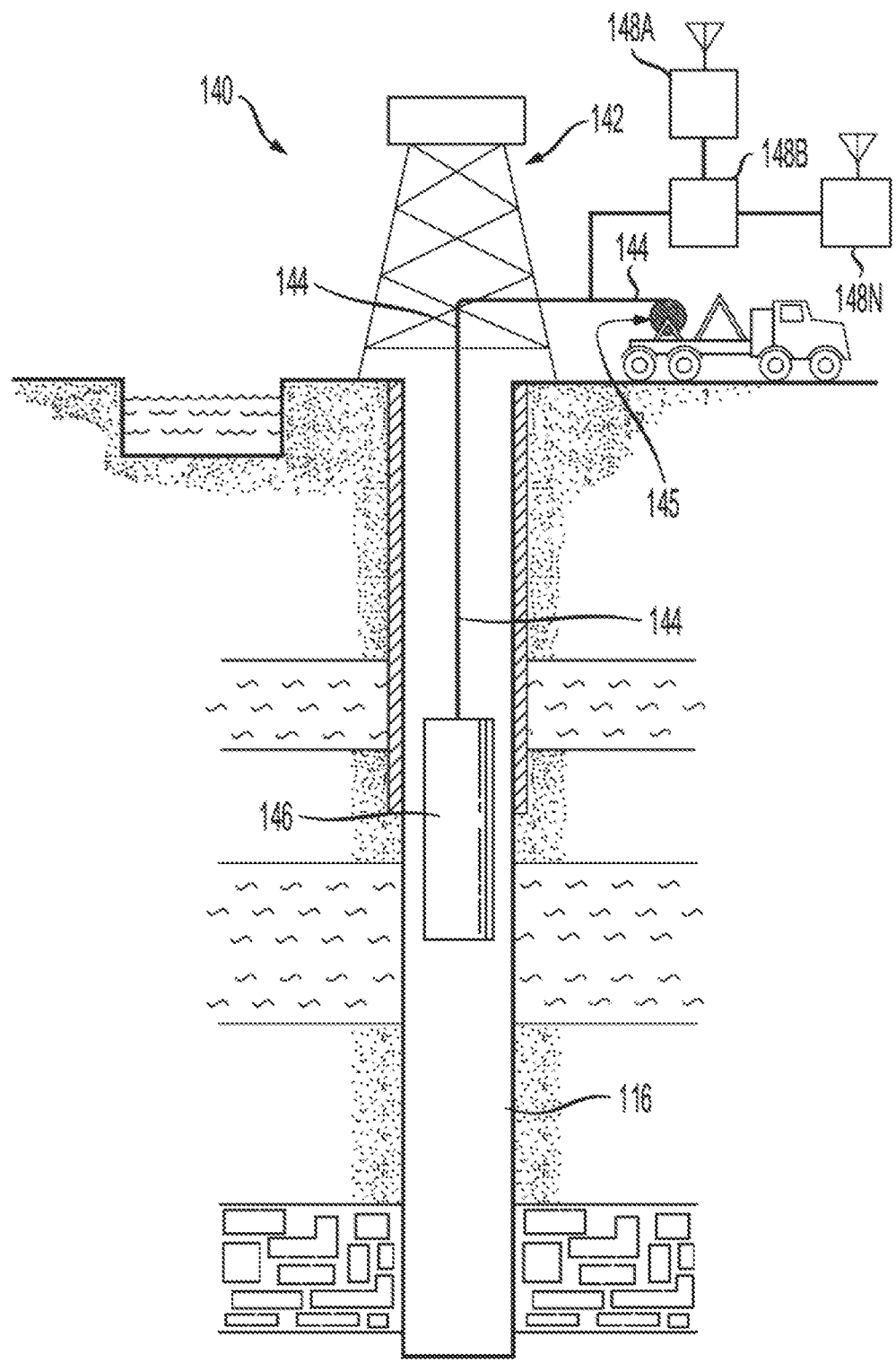
FIG. 1B is a schematic diagram of an example downhole environment having tubulars, in accordance with various aspects of the subject technology.

FIG. 1B is a schematic diagram of an example downhole environment having tubulars, in accordance with various aspects of the subject technology. In this example, an example system 140 is depicted for conducting downhole measurements after at least a portion of a wellbore has been drilled and the drill string removed from the well. An electromagnetic imager tool (not shown) can be operated in the example system 140 shown in FIG. 1B to log the wellbore. A downhole tool is shown having a tool body 146 in order to carry out logging and/or other operations. For example, instead of using the drill string 108 of FIG. 1A to lower the downhole tool, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars. The downhole tool can include an applicable tool for collecting measurements in a drilling scenario, such as the electromagnetic imager tools described herein.

The illustrated wireline conveyance 144 provides power and support for the tool, as well as enabling communication between data processors 148A-N on the surface. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. The processors 148A-N can be integrated as part of an applicable computing system, such as the computing device architectures described herein. Moreover, power can be supplied via the wireline conveyance 144 to meet power requirements of the tool. For slickline or coiled tubing configurations, power can be supplied downhole with a battery or via a downhole generator.

The systems and techniques described herein can monitor substances that are injected into an Earth formation overtime. Injecting a substance into the formation, whether that be CO2 from carbon capture and storage (CCS) process or water and/or steam injected for enhanced oil recovery (EOR), amounts to fluid substitution between formation fluids in place and the injected substance within a target reservoir formation. Given that formation resistivity is highly sensitive to fluid saturation, electromagnetic (EM) data can be acquired, processed, and imaged to monitor the progression of the injected substance over time. Typically, CO2 and steam have higher resistivities than the formation fluids in place and therefore cause an increase in the formation resistivity. On the other hand, salt water can be used in waterflood injection and therefore causes a decrease in formation resistivity. By continuously monitoring substance injections, the systems and techniques described herein can detect leakage from capture reservoirs in a CCS application and/or prevent water intrusion from reducing production in EOR applications.

Such EM monitoring technologies can be deployed in different topologies including surface-to-surface, surface-to-borehole, borehole-to-surface, or cross-borehole. Existing technologies are either limited in their vertical or planar resolution or require extending power and communication lines behind the casing. When wires are located on the outside of a wellbore casing, those wires may be damaged by mechanical abrasion when a casing is lowered into a wellbore.

The systems and techniques described herein can use EM sensors deployed behind the casing that may communicate and/or be powered wirelessly (e.g., using contactless data and/or power transfer techniques). This may include transferring data and power inductively through a wellbore casing. Sets of electronics may be deployed along a tube that is inserted into a wellbore casing. By transferring data and/or power wirelessly through the wellbore casing, the need to run any cables on an outer part of a casing may be eliminated. Multiple topologies that use such EM sensors are disclosed. These topologies may be integrated to provide a wealth of data for three-dimensional (3D) inversion of formation resistivity.

Systems of the present disclosure may use one or more computer models to implement techniques described within the present disclosure. These computer models may be used to evaluate conditions of a reservoir included in an Earth formation. In certain instances, these computer models may include a reservoir model, a medium model, a resistivity model, and a simulation model that may be used to update a fluid saturation model when identifying conditions of the Earth formation. A reservoir model may be constructed from available geological, geophysical, petrophysical, and production data. An effective medium model described by an analytic formula (e.g., Archie's law) may be used to transform the formation and fluid properties of the reservoir model to resistivity properties of the reservoir model. A resistivity model may be populated across a grid based on the resistivity properties determined from the transform. In a simulation module, the resistivity model may be used to generate simulated EM data and to compute their sensitivities with respect to resistivity. The effective medium model or a second defective medium model described by an analytic formula (e.g., Archie's law) may be used to transform the EM sensitivities with respect to resistivity to the EM sensitivities with respect to the saturation of a given fluid (e.g., water, steam, or CO2). An iterative inversion may be performed to generate an updated fluid saturation model that minimizes the misfit between the processed and simulated EM data.

The systems and techniques described herein may deploy sensors, such as electric field sensors, magnetic field sensors, EM field sensors, or galvanic devices down a wellbore on an outside surface of a casing disposed within the wellbore. Non-limiting examples of sensors that can be deployed downhole can include magnetic sensors, electric-field sensors, electromagnetic field sensors, and/or any other sensors or combination thereof. These sensors or related components may send communications or data wirelessly through the wellbore casing to other electronics that are located within the wellbore casing. The components located inside of the wellbore casing may be mounted on a tubing that is inserted into the wellbore casing. Such topologies remove the need to use cables on the outside of the casing. Electromagnetic induction may be performed without use of custom casing joints and without a need to cut holes in a casing.

Various sets of components may be included on the outside of the casing and the inside of the casing. Components on the outside of the casing may include inductors that receive energy, inductors that transmit data through the casing, and/or sensors that sense EM energy transmitted by EM transmitters that may be located at another wellbore or at the surface of the Earth. In certain instances, components located on the outside of the wellbore may transmit EM energy into the Earth next to a wellbore. Components located on the inside of the casing may also include inductors that transmit energy and that receive data from inductors located on the outside of the casing. Components located on the inside of the casing may also include electronics that transmit data to a computer located at the Earth's surface. In some examples, one or more of the components deployed on the inside of the casing may act as relay or repeater stations that propagate data toward a computer that may be located at the surface of the ground and/or any other location. Such stations may include multiple receivers capable of receiving data, such as data multiplexed on a same communication line. Such a communication line may be located on the outside of tubing inserted in a wellbore casing.

Different configurations may include surface-to-surface, borehole-to-surface, and borehole-to-borehole configurations using transmitters and sensors located at the Earth's surface or within one or more boreholes. A borehole-to-surface configuration may provide planar resolution data that may be used to monitor for CO2 progression into the Earth. Cross-borehole (e.g., borehole-to-borehole) tomography may provide additional vertical resolution. Data received from borehole-to-surface and borehole-to-borehole configurations may be combined to provide three-dimensional (3D) monitoring of a CO2 plume in the storage reservoir. Sensors used to collect data may include, for example and without limitation, magnetic sensors, electric-field sensors, electromagnetic field sensors, and/or galvanic device sensors. Combined measurements from different topologies can enable more accurate 3D monitoring of CO2 distributions in Earth formations.

Figure 2:
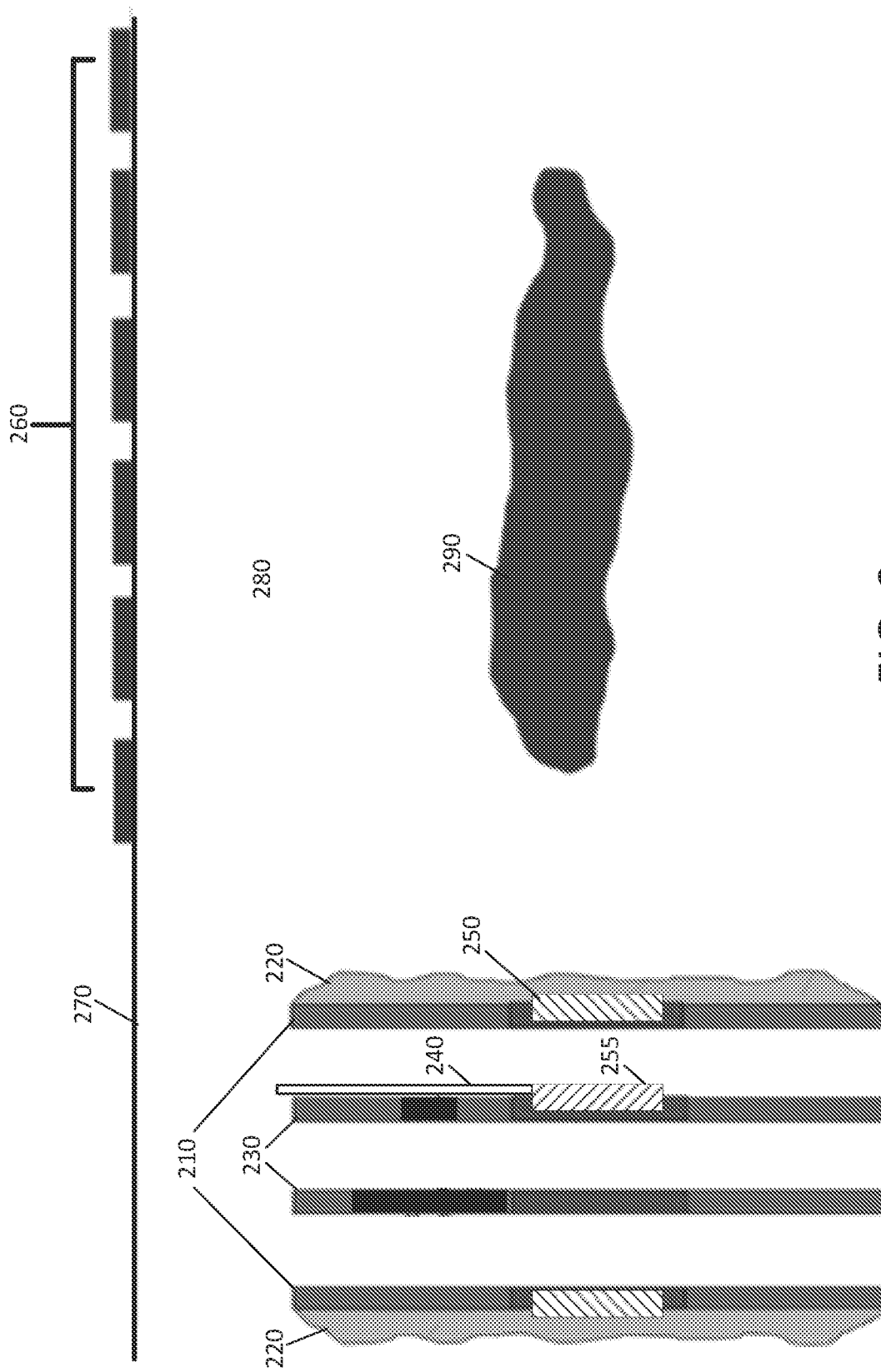
FIG. 2 illustrates example components that may be used to sense conditions within an Earth formation where a wellbore is located, in accordance with various aspects of the subject technology.

FIG. 2 illustrates example components that may be used to sense conditions within an Earth formation where a wellbore is located. FIG. 2 includes wellbore casing 210 and tubing 230 disposed within casing 210. Wellbores are holes drilled into the Earth that are commonly filled with a casing that is cemented into place. Casings can be made from a hard material such as steel, for example. Typically, a casing is cemented into place after the casing is placed into the wellbore. FIG. 2 illustrates cement 220 that attaches casing 210 to Earth formation 280. A set of tubing, such as tubing 230, can be inserted into a casing (e.g., casing 210). In some examples, the tubing 230 can be used to extract hydrocarbons from the earth or may be used to provide other materials (e.g., CO2, water, or steam) into reservoirs 290 within Earth formation 280. In some cases, materials such as steam or water can be injected into an Earth formation to increase the productivity of an oil or gas well. In other cases, materials such as CO2 can be injected into the Earth more frequently to sequester the CO2 in the Earth for longer periods of time. Processes that inject fluids into the Earth can pump those fluids from Earth surface 270 using pumps. FIG. 2 shows an array of electrical/electronic components 260 disposed on Earth surface 270. The electrical/electronic components 260 may be referred to as a surface array. The array of electrical/electronic components 260 may transmit EM energy into Earth formation 280 or may receive EM energy that was transmitted into Earth formation 280 by electrical/electronic components 250. Reservoir 290 can contain/store steam, water, and/or carbon dioxide (CO2), which may be pumped into it using one or more pumps. Reservoir 290 may be part of Earth formation 280 where voids or cracks are located. CO2 or other materials may be pumped into reservoir 290 from Earth surface 270. The systems and techniques described herein may be used to monitor the materials (e.g., CO2, steam, and/or waterflood progression) in reservoir 290 over time. Such monitoring may include interpreting time-lapse resistivity models to monitor CO2, steam, and/or waterflood progression. This may include updating injection rates or injection pressures based on conditions that exist within Earth formation 280. Observations made when materials are pumped into the Earth may be used to identify when remedial actions should be performed. These observations may include identifying that resistivities of a reservoir or Earth formations that surround that reservoir are increasing or decreasing as discussed above. For example, a reservoir boundary as estimated from seismic imaging or other means may be used to identify an extent of the resistivity distribution (possibly in three dimensions—3D) through EM inversion, and the elevated CO2 injection pressure to maintain a predefined flow rate can be combined to indicate that full storage capacity of the reservoir is reached. Further injection will cease and the injection well may then be shut in (e.g., capped and/or closed).

Electrical/electronic components 250 can include one or more electrical/electronic components that may receive or transmit electromagnetic signals. Electrical/electronic components 260 and electrical/electronic components 250 may be configured to work together to collect data about conditions within Earth formation 280. Collected data may be evaluated to identify parameters associated with reservoir 290. Changes in resistivity, for example, may be indicative of a percent saturation of CO2 in reservoir 290. Analysis of collected data may be used to identify whether a volumetric space where CO2 or other materials are disposed is growing or expanding in a reservoir. Such an analysis may identify that changes in resistivities of a wellbore correspond to a reservoir being filled with CO2 up to a point where the reservoir is filled to a maximum capacity. When the analysis identifies that the resistivities of Earth formations next to a reservoir are changing, a determination may be made that the reservoir has reached a maximum capacity. Alternatively or additionally, this analysis may identify how far a fracturing fluid is propagating into an Earth formation. FIG. 2 includes a set of electrical/electronic components 255 attached to tubing 230 that may send and/or receive data and/or power to electrical/electronic components 250 through casing 210. In certain instances, data and/or power may be sent though casing 210 using electromagnetic induction. Wires and/or communication lines 240 may be used to provide power and/or data to electrical/electronic components 255. Wires and/or communication lines 240 may include a single wire or cable or multiple wires or cables. In some examples, wires and/or communication lines 240 may include one or more fiber optic cables. When electromagnetic induction is used to sense attributes of an Earth formation, surface array electrical/electronic components 260 may include coils of wire that transmit or receive electromagnetic energy. Electrical/electronic components 250 may also include coils that receive or transmit electromagnetic energy. Once electromagnetic energy is received by a coil or other sensor, other components may generate a stream of data that may be used by a computer to evaluate conditions within Earth formation 280. In such instances, pulses of electromagnetic energy may be transmitted into Earth formation 280. After those pulses travel through Earth formation 280, they may be received at coils included in electrical/electronic components 250. Electrical/electronic components 250 may then send data to electrical/electronic components 255 of FIG. 2. This data may then be sent to a computer at Earth surface 270 via wires and/or communication lines 240. The computer may perform an analysis on the data received via wires and/or communication lines 240. Here again, the analysis may identify that changes in resistivities of a wellbore correspond to a reservoir being filled with CO2 up to a point where the reservoir is filled to a maximum capacity. When an analysis identifies that the resistivities of Earth formations next to a reservoir are changing, a determination may be made that the reservoir has reached a maximum capacity. Here again, this analysis may identify that changes in resistivities of a wellbore correspond to a reservoir being filled with CO2 up to a point where the reservoir is filled to a maximum capacity. When the analysis identifies that the resistivities of Earth formations next to a reservoir are changing, a determination may be made that the reservoir has reached a maximum capacity. Alternatively or additionally, this analysis may identify how far a fracturing fluid is propagating into an Earth formation.

Since wires and/or communication lines 240 are located within casing 210, these wires are protected by casing 210. When electrical/electronic components 255 and wires and/or communication lines 240 are placed on an external surface of tubing 230, tubing 230 can be inserted into casing 210 in a manner that aligns wireless data and/or power coupling devices included in electrical/electronic components 255 with coupling devices included in electrical/electronic components 250.

Figure 3:
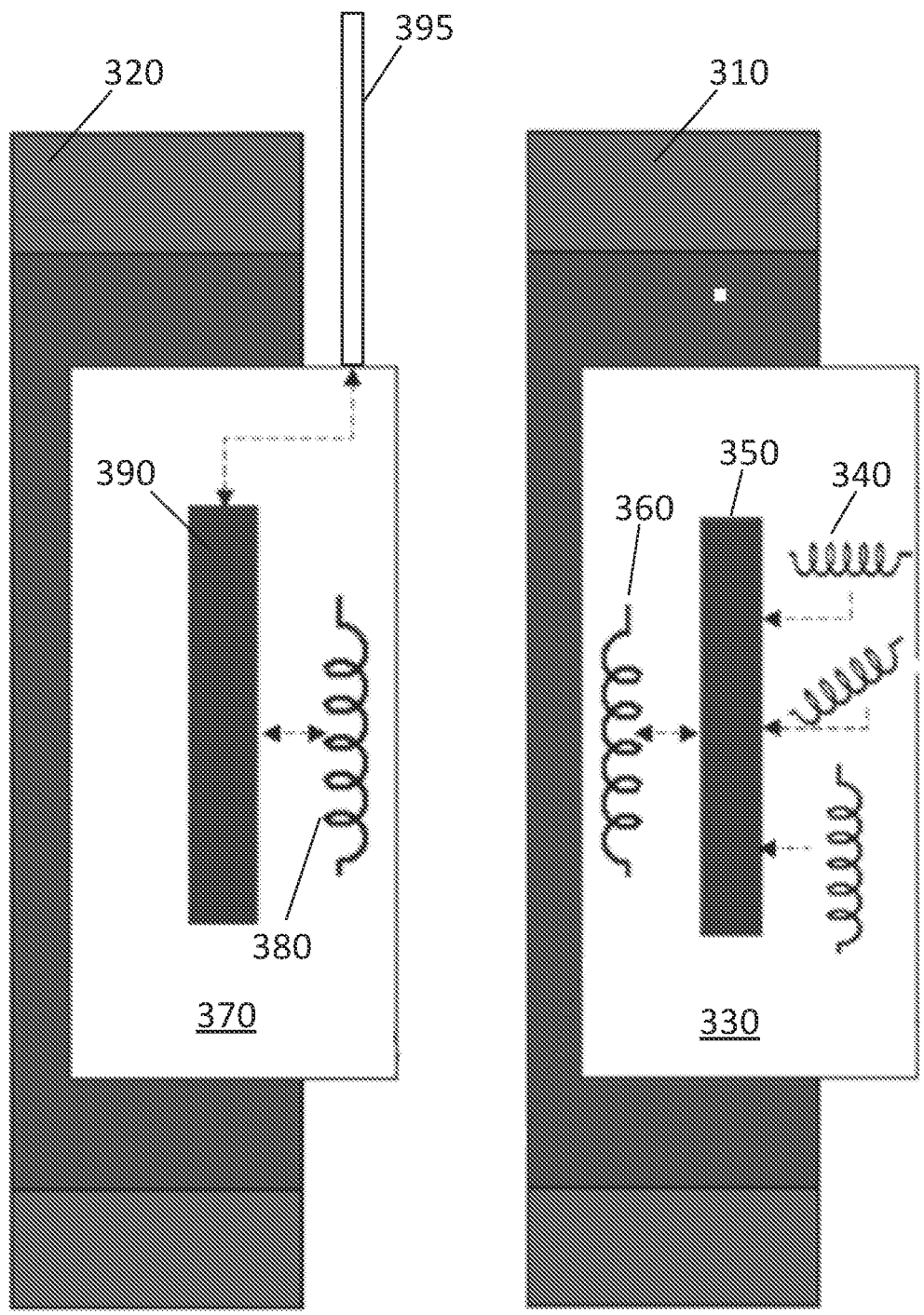
FIG. 3 illustrates example components that may be attached to an outer surface of a wellbore casing that receives power wirelessly from other components that are located inside of the wellbore casing, in accordance with various aspects of the subject technology.

FIG. 3 illustrates components that may be attached to an outer surface of a wellbore casing that receives power wirelessly from other components that are located inside of the wellbore casing. FIG. 3 includes a portion of casing 310 that includes electrical/electronic components 330. Tubing portion 320 may be a portion of a tube that is located inside of casing 310. Triaxial coils 340 is a set of three inductors (a triaxial set of inductors) that are oriented in three different directions that may be perpendicular to each other (e.g., along an X axis, a Y axis, and a Z axis).

The triaxial coils 340 may be a set of inductors/coils that form an electrical component that may be configured to receive or transmit electromagnetic signals through an Earth formation as discussed in respect to FIG. 2. The set of electrical/electronic components 330 includes electronic components 350 and inductor/coil 360. By arranging the triaxial coils 340 along three different axes, data associated with how electromagnetic waves travel through the Earth may be collected. Analysis of signals received via triaxial coils 340 may allow 3D visualizations to be generated. These visualizations may depict the flow of materials into an Earth formation or reservoir that exists in an Earth formation.

In instances when triaxial coils 340 are used to transmit electromagnetic energy into an Earth formation, electronic components 350 may be used to convert a DC voltage into AC stimulus voltages that energize each of the three coils of the triaxial inductor coil set 340. An amount of power transmitted into the Earth formation may correspond to stimulus voltage and currents provided to each coil of the triaxial inductor coil set 340. Pulses of energy may be transmitted that span several periods of a given stimulus frequency. Each of the three coils may receive stimulation voltages simultaneously or they may be received at different moments in time. For example, the first coil may be stimulated at a first time, the second coil may be stimulated at a second time, and the third coil may be stimulated at a third time, where each of the first time, the second time, and the third time begin and end at different moments in time. When triaxial coils 340 are oriented along three different axis (e.g., an X axis, a Y axis, and a Z axis), EM energy may be emitted in three directions at the same time along the three different respective X, Y, and Z axes at different moments in time.

Electrical/electronic components 330 include electronic components 350 and inductor/coil 360. Electronic components 350 may be any type of electronic circuit that receives signals from triaxial coils 340 and that prepares data associated with those signals to be sent via inductor/coil 360 to electrical/electronic components 370. By using inductors/coils 360 and 380, data may be sent through casing 310 without direct electrical connection (e.g., by contactless inductive data communication).

In some examples, electronic components 350 may convert signals received via triaxial coils 340 into a stream of data. Such a stream of data may include levels of amplitude received via a first coil of triaxial coils 340 oriented along an X axis, an amplitude received via a second coil of triaxial coils 340 oriented along a Y axis, and an amplitude received via a third coil of triaxial coils 340 oriented along a Z axis. This stream of data may be a serial stream where data associated with different coils are arranged sequentially (e.g., X axis data, followed by Y axis data, followed by Z axis data). Each of the sets of sequential data may have been received at a same (or substantially the same) moment in time after EM transmitting elements transmit EM energy for receipt by triaxial coils 340. Signals received by each of the three coils of the triaxial coil set 340 may be received after another set of triaxial coils were used to transmit electromagnetic energy into the Earth. Such transmissions may have been transmitted by stimulating three coils oriented along different axis. Moreover, the different coils may be provided respective stimulation voltages at the same time or at different times (times that are offset from each other).

This stream of data may be provided to inductor/coil 360 that transmits the data stream through casing 310 for receipt by inductor/coil 380 of electrical/electronic components 370. An electrical signal provided across inductor/coil 360 may be used to generate an EM field that emanates from inductor/coil 360. This EM field may penetrate through casing 310 to inductor/coil 380. The EM field received by inductor/coil 380 will induce the flow of electrical current through inductor/coil 380 and this current flow will generate a signal received by inductor/coil 380. The electrical signal provided across inductor/coil 360 may have data superimposed or modulated into that signal and that signal may transfer the data to inductor/coil 380 using electromagnetic induction. Signals received by coil inductor/380 may be prepared for transmission using electronic components 390 and data may be sent to a computer at the Earth's surface via wires and/or communication lines 395. The unnumbered double arrowed line of FIG. 3 indicates that wires and/or communication lines 395 may transfer data and/or power to electrical/electronic components 370.

The surface array electrical/electronic components 260 of FIG. 2 may be used to transmit electromagnetic energy to triaxial coils 340. Alternatively or additionally, triaxial coils 340 may be used to transmit electromagnetic energy to a surface array, such as surface array electrical/electronic components 260 of FIG. 2. In certain instances, a surface array may include one or more sets of triaxial coils that are similar to triaxial coils 340.

Coils used to make triaxial coils 340 or inductive surface array coils may be of any configuration. For example, coils used to make triaxial coils 340 may include flat coils (e.g., where conductors are arranged in a spiral shape within a single plane), may be toroidal coils (e.g., where wires are wrapped around a toroid shaped core), or any suitable configuration.

A voltage may be provided to the electrical/electronic components 370 via wires included in wires and/or communication lines 395 to power electrical/electronic components 370. For example, a voltage in the form of a direct current (DC) voltage or a voltage in the form of an alternating current (AC) voltage may be provided to power electrical/electronic components 370. Example voltages include, but are not limited to, 12 VDC, 24 VDC, 24 VAC, and 40 VAC. Electronic components 390 may provide AC power to electrical/electronic components 330 via inductors/coils 380 and 360. In such instances, inductors/coils 380 and 360 transfer energy inductively using transformer action. This could include converting an input voltage into an output voltage. For example, an input voltage of 12 VDC could be converted into an AC voltage of 24 VAC and some portion of that 24 VAC voltage may be provided to inductor/coil 360, and electronic components 350 may convert the received AC voltage into a DC voltage. Voltage provided to electronic components 350 may be used to charge a battery, capacitor, or other energy storage device that may be included within an assembly that houses electrical/electronic components 330. Any combination of power conversion may be used, including but not limited to, DC to DC, DC to AC, or AC to DC conversion at various locations within any of the electrical/electronic components illustrated in FIG. 3. Wires and/or communication lines 395 may include a fiber optic cable that is used to transmit data to or from a computer at the surface of a wellbore.

Timing of when electrical power is inductively coupled between inductor/coil 380 and inductor/coil 360 and when data is sent via inductor/coil 360 and 380 may be alternated. For example, power may be transferred from inductor/coil 380 to inductor/coil 360 during a first time period and data may be sent via inductor/coil 360 to inductor/coil 380 during a second time period. By alternating times when power is transferred in one direction and when data is transferred in another direction, the fidelity of the data transfer between the inductors/coils 360 and 380 may be increased.

When the triaxial coils 340 are used to transmit pulses of energy to a surface array or other electromagnetic receivers. Data and/or power may be transferred from inductor/coil 380 to inductor/coil 360. In such an instance, both data and power may be transferred at the same time. Data transmitted from inductor/coil 380 to inductor/coil 360 may trigger electronic components 350 to emit pulses of electromagnetic energy via triaxial coils 340. As such, a computer located at the surface of a wellbore may be used to synchronize timing of emitted electromagnetic energy.

Wires and/or communication lines 395 running along the tubing can include, for example and without limitation, a wired line, a fiber optic cable, and/or an acoustic telemetry waveguide. Wireless through-casing technology enables the placement of permanent sensors (e.g., coils, triaxial coils, electric field sensors, magnetic field sensors, and/or electromagnetic field sensors) on an outer part of casing 310. The system may use inductive coupling or other electromagnetic techniques to transfer power and data through the casing wirelessly. This provides power and data transfer without the need for batteries or extra barrier penetrations. On the tubing side, power and communications may be transferred using one or more cables such as, for example, a wire, a fiber optic cable, etc. While, in some cases, batteries or other electrical power storage devices may not be needed, they still may be included within a set of components attached to the outside surface of a wellbore casing.

A communication scheme used can include a one-way communication system. This may allow a computer to take a reading by providing power to a set of sensing components. The tubing side may include discrete sets of electrical/electronic components or stations that wirelessly power sensors on the outside of a casing. Electrical/electronic components may digitize receiver voltages and automatically transmit digital data back to the computer. In certain instances, a sensor may only be powered up when a reading is needed or desired. Moreover, the sensor may automatically take and send a reading when it receives power. The sensor may transmit data by modulating a current/load that it takes from an inductive coupler. Components included inside of the wellbore casing may detect this change in current or load and decode the sensor data from these modulated changes.

In other instances, a communication scheme may include a two-way communication system. Here, particular stations on the tubing may energize a set of sensors located on the outside of a casing. Sensor acquisition components of electric/electronic components 330 may use energy inductively coupled through casing 310 to digitize the sensor data and transmit it wirelessly via sets of repeaters or relays that may also be disposed within casing 310.

Components 370 may be located on a tube. Inductor/coil 380 may be provided with power such as, for example, 5 Watts of power, where a certain amount (e.g., about 0.15 Watts or any other amount) of that power may be transferred through casing 310. The power received by inductor/coil 360 may be sufficient to power electrical/electronic components 330. In certain instances, an operating frequency of an inductive coupler may be tuned for each deployment. Non-limiting example data rates used by such a system may vary and may include a rate between 150 to 5000 bits per second. The operating frequency may depend on the number of layers used to fabricate a casing or may vary on the thickness of the casing. Non-limiting examples of frequency ranges may include from 100 Hz to 10 kHz. Lower frequencies may be used in instances when a casing includes more layers or has a thickness that is greater than a threshold thickness.

In other instances, the electrical/electronic components 330 behind the casing may be powered by batteries. Signals received by sensors such as triaxial coils 340 may be communicated wirelessly uphole using electromagnetic or acoustic telemetry systems on the outside of the casing. In this case, repeater stations may be mounted on the outside of the casing and could be integrated with packages of the electrical/electronic components 370.

In yet other instances, the electrical/electronic components 330 behind the casing could be equipped with a piezoelectric power generator that harnesses vibration of the casing or acoustic signals transmitted from electrical/electronic components 370 located within casing 310. Any signals received by a sensing element may be digitized and then be communicated uphole using electromagnetic or acoustic telemetry systems. Such electromagnetic or acoustic telemetry systems may be located on the outside of the casing or may be located within casing 310.

Figure 4:
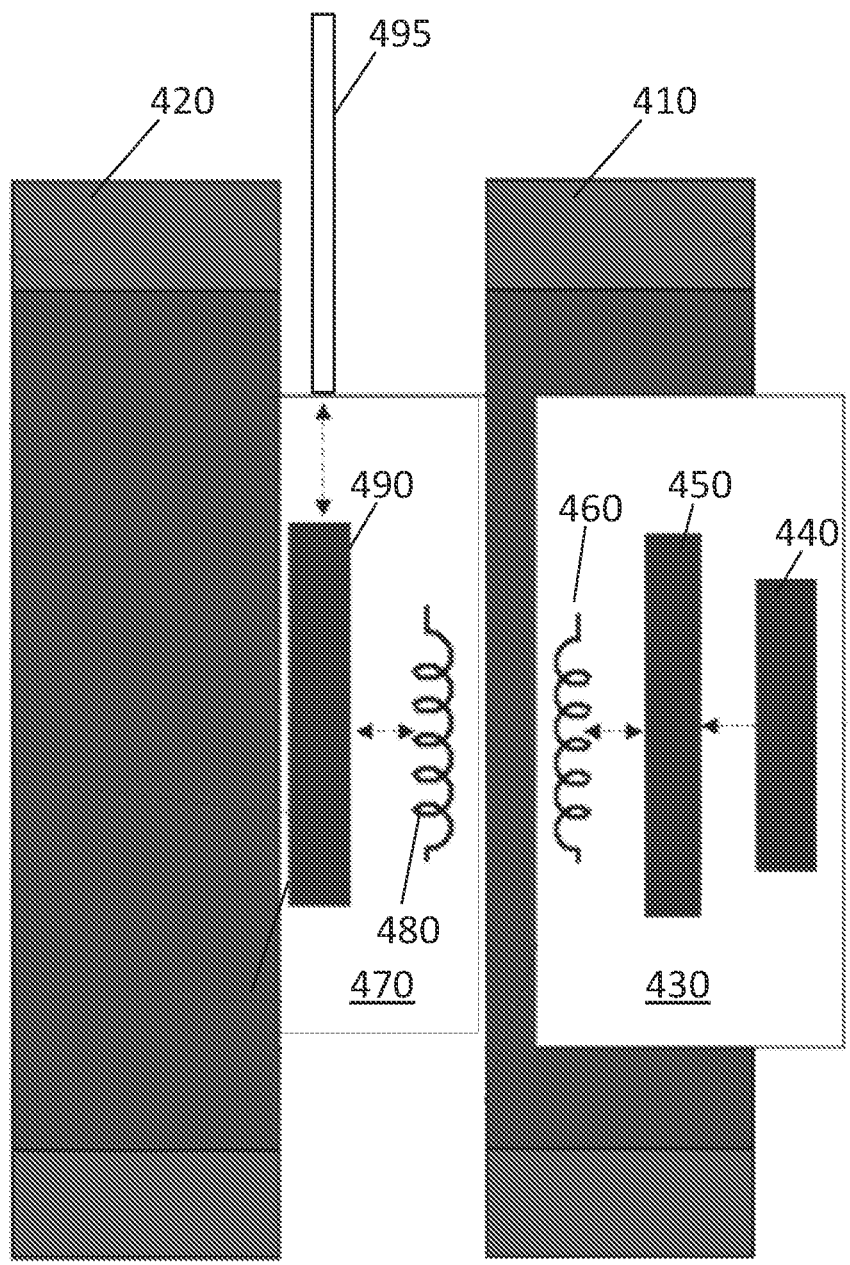
FIG. 4 illustrates example inductive components that transfer power and data wirelessly through a wellbore casing, in accordance with various aspects of the subject technology.

FIG. 4 illustrates inductive components that transfer power and data wirelessly through a wellbore casing. FIG. 4 includes many of the components discussed above with respect to FIG. 3, but instead of including a triaxial coil set, electrical/electronic components 430 may include other transmitters and/or sensors 440 that transmit or sense electrical fields, magnetic fields, or combinations of electric and magnetic fields.

More specifically, FIG. 4 includes a portion of casing 410 that includes electrical/electronic components 430. Item 420 may be a portion of a tube that is located inserted inside of casing 410. As mentioned above, transmitters and/or sensors 440 may transmit or sense electrical fields, magnetic fields, or combinations of electric and magnetic fields.

Electrical/Electronic components 430 include electronic components 450 and inductor/coil 460. Electronic components 450 may include any type of electronic circuit board that prepares signals received via sensing elements of transmitters and/or sensors 440 for transmission via inductor/coil 460 to electrical/electronic components 470. In some examples, electronic components 450 may convert signals received via the sensing elements of transmitters and/or sensors 440 into a stream of data. Such a stream of data may include levels of amplitude received via the sensing elements of transmitters and/or sensors 440 along different axes (e.g., an X axis, a Y axis, or a Z axis). This stream of data may include a serial stream where data associated with different discrete sensors are concatenated into the serial stream of data. In some cases, each of the sets of sequential data may be received at a same (or substantially the same) moment in time.

This stream of data may be provided to inductor/coil 460. Inductor/coil 460 transmits the data stream through casing 410 for receipt by inductor/coil 480 of electrical/electronic components 470. Signals received by inductor/coil 480 may be prepared for transmission using electronic components 490 and data associated with the signals received by inductor/coil 480 may be sent to a computer at the Earth's surface (and/or any other location) via wires and/or communication line 495. The unnumbered double arrowed line of FIG. 4 indicates that wires and/or communication lines 495 may transfer data and/or power to electrical/electronic components 470. Here again, a surface array may be used to transmit electromagnetic energy to the sensing element of transmitters and/or sensors 440. Alternatively or additionally, transmitting elements of transmitters and/or sensors 440 may be used to transmit electromagnetic energy to a surface array, such as surface array electrical/electronic components 260 of FIG. 2.

Power may be provided via wires and/or communication lines 495 to electrical/electronic components 470. For example, a voltage in the form of a direct current (DC) voltage or a voltage in the form of an alternating current (AC) voltage may be provided to power electrical/electronic components 470. Non-limiting example voltages include 12 VDC, 24 VDC, 24 VAC, and 40 VAC. Electronic components 490 may provide AC power to electrical/electronic components 430 via inductors/coils 480 and 460. This could include converting an input voltage into an output voltage. In such instances, inductors' coils 480 and 460 transfer energy inductively using transformer action. For example, an input voltage of 12 VDC could be converted into an AC voltage of 24 VAC and some portion of that 24 VAC voltage may be provided to inductor/coil 460 and electronic components 450 may convert the received AC voltage into a DC voltage. Voltage provided to electronic components 450 may be used to charge a battery, capacitor, or other energy storage device that may be included within an assembly that houses electrical/electronic components 430.

Any combination of power conversion may be used, including but not limited to, DC to DC, DC to AC, or AC to DC conversion at various locations within any of the electrical/electronic components illustrated in FIG. 4.

Timing when electrical power is inductively coupled between inductor/coil 480 and inductor/coil 460 and when data is sent via inductor/coil 460 and 480 may be alternated. For example, power may be transferred from inductor/coil 480 to inductor/coil 460 during a first time period and data may be sent via inductor/coil 460 to inductor/coil 480 during a second time period. By alternating times when power is transferred in one direction and when data is transferred in another direction, the fidelity data signals transferred between the inductors/coils 460 and 480 may be increased.

When transmitting elements of transmitters and/or sensors 440 transmit pulses of energy to a surface array or other electromagnetic receivers, both data and power may be transferred from inductor/coil 480 to inductor/coil 460. In such an instance, both data and power may be transferred at the same time. Data transmitted from inductor/coil 480 to inductor/coil 460 may trigger electronic components 450 to emit pulses of electromagnetic energy via the transmitting elements of transmitters and/or sensors 440.

Figure 5:
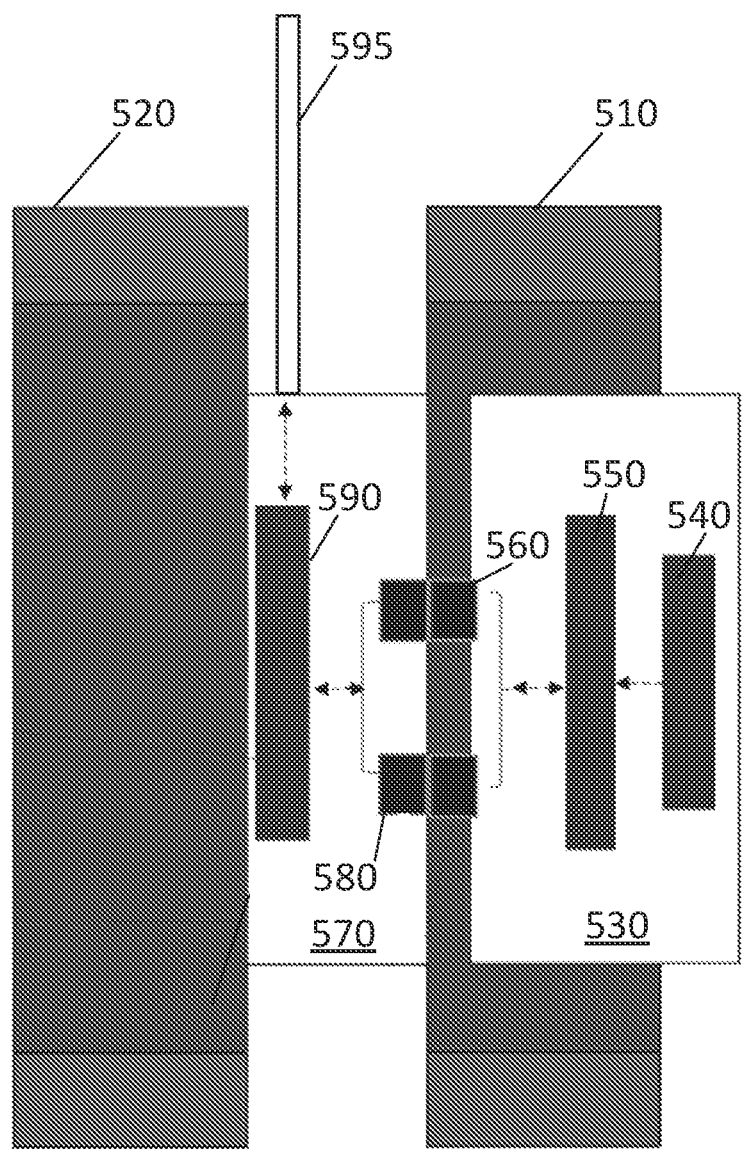
FIG. 5 illustrates example capacitive components that transfer power and data wirelessly through a wellbore casing, in accordance with various aspects of the subject technology.

FIG. 5 illustrates capacitive components that transfer power and data wirelessly through a wellbore casing. FIG. 5 includes some of the elements discussed in respect to FIG. 4. However, instead of including inductors/coils 480 and 460, FIG. 5 includes capacitive contact elements 580 and 560 that may capacitively couple power and/or data through casing 510. Electronic components 550 may include sensors that sense electrical fields, magnetic fields, or combinations of electric and magnetic fields or electronic components 550 may include elements that transmit electric fields, magnetic fields, or combinations of electric and magnetic fields.

More specifically, FIG. 5 includes a portion of casing 510 that includes electrical/electronic components 530. Item 520 may be a portion of a tube located/inserted inside of casing 510. Transmitters and/or sensors 540 may transmit or sense electrical fields, magnetic fields, or combinations of electric and magnetic fields. The set of electrical/electronic components 530 includes electronic components 550 and capacitive contact 560.

Electrical/Electronic components 530 include electronic components 550 and contact 560. Electronic components 550 may be any type of electronic circuit that prepares signals received via transmitters and/or sensors 540 for transmission capacitive contact 560 to capacitive contact 580 of electrical/electronic components 570. In an example, electronic components 550 converts signals received via transmitters and/or sensors 540 into a stream of data. Such a stream of data may include levels of amplitude received via transmitters and/or sensors 540 oriented along an X axis, transmitters and/or sensors 540 oriented along a Y axis, and transmitters and/or sensors 540 oriented along a Z axis. This stream of data may be a serial stream where data associated with different sensors are arranged sequentially (e.g., X axis data, followed by Y axis data, followed by Z axis data). Each of the sets of sequential data may have been received at a same moment in time.

This stream of data may be provided to capacitive contact 560 that transmits the data stream through casing 510 for receipt by capacitive contact 580 of electrical/electronic components 570. Signals received by capacitive contact 580 may be prepared for transmission using electronics 590 and data associated with the signals received by capacitive contact 580 may be sent to a computer at the Earth's surface via wires and/or communication lines 595. The unnumbered doubled arrowed line of FIG. 5 indicates that wires and/or communication lines 595 may transfer data and/or power to electrical/electronic components 570. Here again, a surface array may be used to transmit electromagnetic energy to transmitters and/or sensors 540. Alternatively or additionally, transmitters and/or sensors 540 may be used to transmit electromagnetic energy to a surface array, such as surface array electrical/electronic components 260 of FIG. 2.

Power may be provided via wires and/or communication lines 595 to electrical/electronic components 570. For example, a voltage in the form of a direct current (DC) voltage or a voltage in the form of an alternating current (AC) voltage may be provided to power electrical/electronic components 570. Exemplary voltages include, yet are not limited to 12 VDC, 24 VDC, 24 VAC, and 40 VAC. Electrical/electronic components 570 may then provide AC power to electrical/electronic components 530 via capacitive contacts 580 and 560. This could include converting an input voltage into an output voltage. For example, an input voltage of 12 VDC could be converted into an AC voltage of 24 VAC and some portion of that 24 VAC voltage may be provided to capacitive contact 560 and electronic components 550 may convert the received AC voltage into a DC voltage. Voltage provided to electronic components 550 may be used to charge a battery, capacitor, or other energy storage device that may be included within an assembly that houses electrical/electronic components 530. Any combination of power conversion may be used, including but not limited to, DC to DC, DC to AC, or AC to DC conversion at various locations within any of the electrical/electronic components illustrated in FIG. 5.

Timing may of when electrical power is inductively coupled between capacitive contact 580 and capacitive contact 560 and when data is sent via capacitive contacts 560 and 580 may be alternated. For example, power may be transferred from capacitive contact 580 to capacitive contact 560 during a first time period and data may be sent via capacitive contact 560 to capacitive contact 580 a second time period. By alternating times when power is transferred in one direction and when data is transferred in another direction may help improve the fidelity of data signals transferred between capacitive contacts 560 and 580.

When the transmitters and/or sensors 540 are used to transmit pulses of energy to a surface array or other electromagnetic receivers, both data and power may be transferred from capacitive contact 580 to capacitive contact 560. In such an instance, both data and power may be transferred at the same time. Data transmitted from capacitive contact 580 to capacitive contact 560 may trigger electronic components 550 to emit pulses of electromagnetic energy via transmitters and/or sensors 540.

Figure 6:
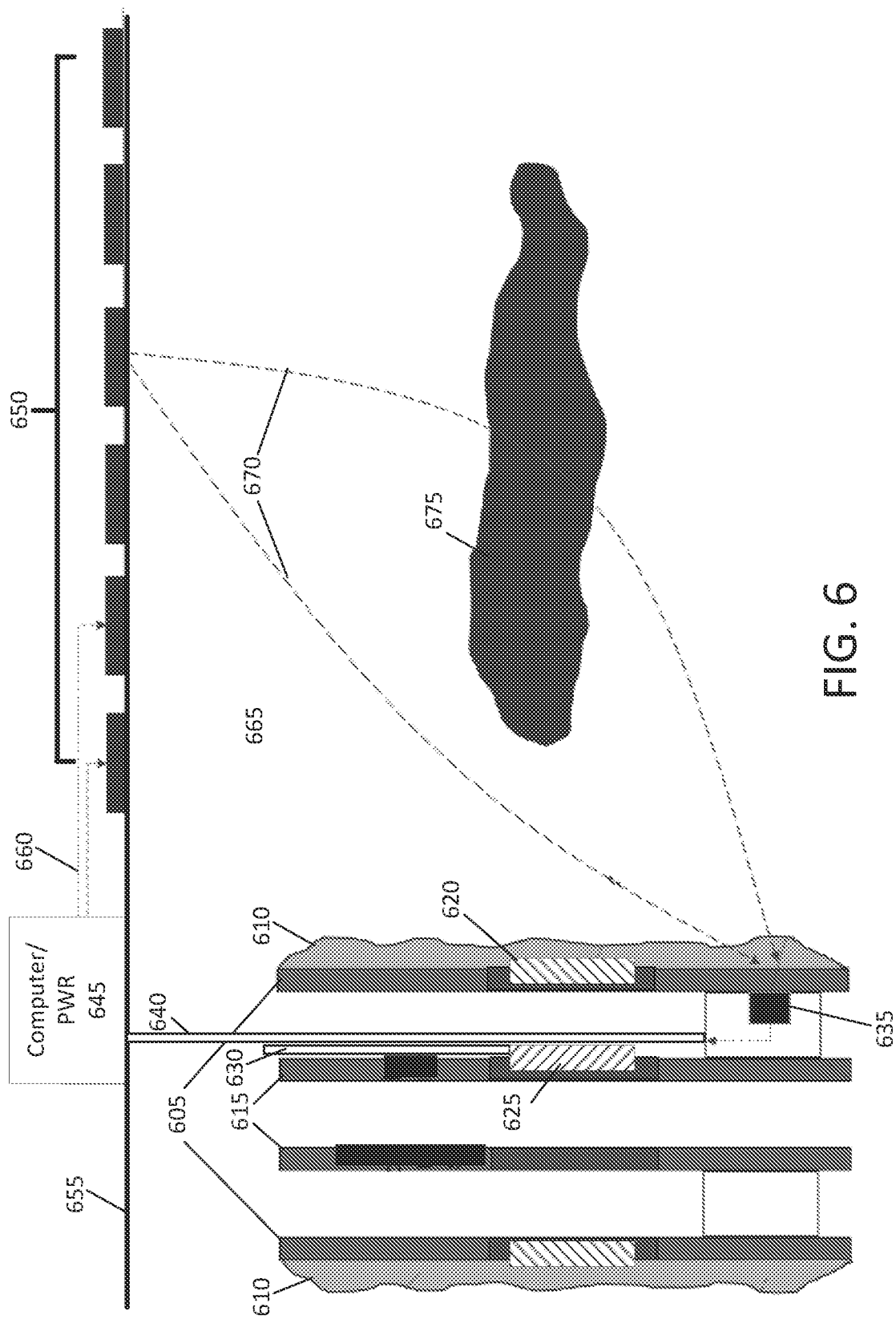
FIG. 6 illustrates an example wellbore sensing configuration that uses galvanic action to sense electromagnetic fields after those electromagnetic fields are transmitted through an Earth formation, in accordance with various aspects of the subject technology.

FIG. 6 illustrates a wellbore sensing configuration that uses galvanic action to sense electromagnetic fields after those electromagnetic fields are transmitted through an Earth formation. FIG. 6 includes casing 605, cement 610, tubing 615, and other components that may be included in an apparatus that senses electrical or electromagnetic fields 670 transmitted through Earth formation 665. Earth formation 665 is illustrated as having a reservoir 675 that may be used to receive and/or store CO2, steam, and/or water like reservoir 290 of FIG. 2. Cement 610 may be a layer that attaches casing 610 to Earth formation 665.

Assembly 620 is attached to an outer portion of casing 605 and assembly 625 is illustrated as being attached to tubing 615. Wire 630 may be used to transfer data and or power between assembly 625 and a computer or power assembly 645 located at surface 655 of a wellbore. Assembly 620 and 625 may include components that are similar or identical to electrical/electronic components 530 and 570 of FIGS. 5, 430 and 470 of FIG. 4, or 330 and 370 of FIG. 3. In some cases, assemblies 620 and 625 may perform other functions than those described above with respect to electrical/electronic components 530 and 570 of FIGS. 5, 430 and 470 of FIG. 4, and/or 330 and 370 of FIG. 3. This means that a wellbore may include sensing and/or stimulation elements of different types and data received from one types of sensing element may be used to validate data received from another type of sensing element.

FIG. 6 also includes galvanic device 635 that may be used to provide electromagnetic energy to Earth formation 665 or that may receive electromagnetic energy provided by surface array elements 650. Pulses of electromagnetic energy 670 may be transmitted into Earth formation 665 when conditions of Earth formation 665 or reservoir 675 are monitored. In operation, surface array elements 650 may emit pulses of electromagnetic energy 670 into Earth formation 665 and that electromagnetic energy 670 may move through Earth formation 665 where a portion of that energy is received by galvanic device 635 and a signal or data associated with the receipt of the portion of electromagnetic energy may be provided to computer/power assembly 645 via wires and/or communication lines 640. Computer/power assembly 645 may control the operation of surface array elements 650. This may include providing power to one or more sensing or transmission elements that are part of surface array elements 650. Here computer/power assembly 645 may trigger the transmission of electromagnetic pulses 670 into Earth formation 665 based on power or trigger signals provided by control element 660.

In certain instances, galvanic device 635 may be controlled by computer/power assembly 645 to transmit electromagnetic energy 670 into Earth formation 665 for receipt by surface array elements 650. Note that surface array elements 650 may include at least one of coils, triaxial coils, galvanic devices (e.g., sensors/emitters), electric field sensors, and/or magnetic field sensors. Galvanic device 635 may send stimulations of electromagnetic energy or receive electromagnetic energy transmitted by another transmitter and this transmitted or received electromagnetic energy may propagate through casing 605 without need for galvanic device 635 touching Earth formation 665.

Figure 7:
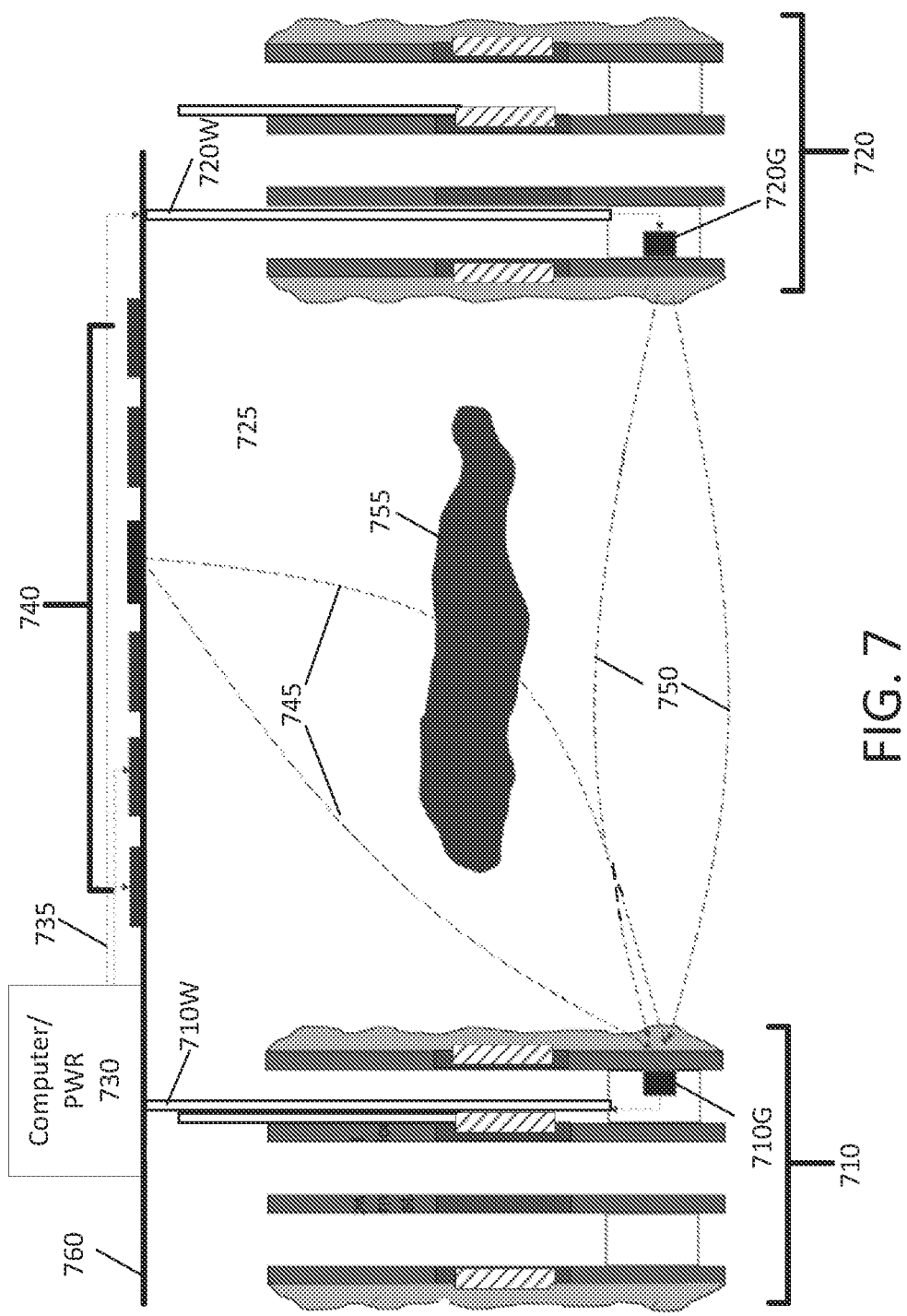
FIG. 7 illustrates an example electromagnetic field monitoring system that includes galvanic elements located at the surface of the Earth and in different wellbores, in accordance with various aspects of the subject technology.

FIG. 7 illustrates an electromagnetic field monitoring system that includes elements located at the surface of the Earth and in different wellbores. FIG. 7 includes a first wellbore assembly 710 and a second wellbore assembly 720 that may include some or all of the elements discussed in respect to FIG. 6. For clarity, all of the components located within a particular wellbore of FIG. 7 are not numbered. Wellbore assembly 710 includes galvanic device 710G and wire(s) 710W, and wellbore assembly 720 includes galvanic device 720G and wire(s) 720W. Galvanic devices 710G and 720G and respective wire(s) 710W and 720W may operate in a manner similar to galvanic device 635 and wires and/or communication lines 640 of FIG. 6.

Also shown in FIG. 7 are computer/power assembly and surface array elements 740 located at the Earth surface 760. As discussed above with respect to FIG. 6, computer power assembly 730 may control operation of or receive data from surface array elements 740, galvanic device 710G, and/or galvanic device 720G. Computer/power assembly 730 may provide power to or control signals via control lines 735, wire(s) 710W, or wire(s) 720W. Electromagnetic energy may be transmitted through Earth formation 725 between various elements. In some examples, electromagnetic energy may be transferred from surface array elements 740 to galvanic device 710G; from galvanic device 710G to surface array elements 740, or from galvanic device 710G to galvanic device 720G. This may allow a computer of computer/power assembly 730 to control emissions of electromagnetic energy 745 and 750 and receive data. Here again control lines 735, wires 710W, or wires 720W may be used to trigger emissions or to receive data from sensing elements. FIG. 7 illustrates an example transferring of electromagnetic energy 745 between surface array elements 740 located at Earth surface 760 and galvanic device 710G of assembly 710. FIG. 7 also illustrates a borehole-to-borehole transfer of electromagnetic energy 750 between galvanic device 710G located at assembly 710 and galvanic device 720G of assembly 720.

By being able to transmit and receive energy in various directions data from different sensors may be used to construct a 3D image of conditions within Earth formation 725 or within reservoir 755.

Figure 8:
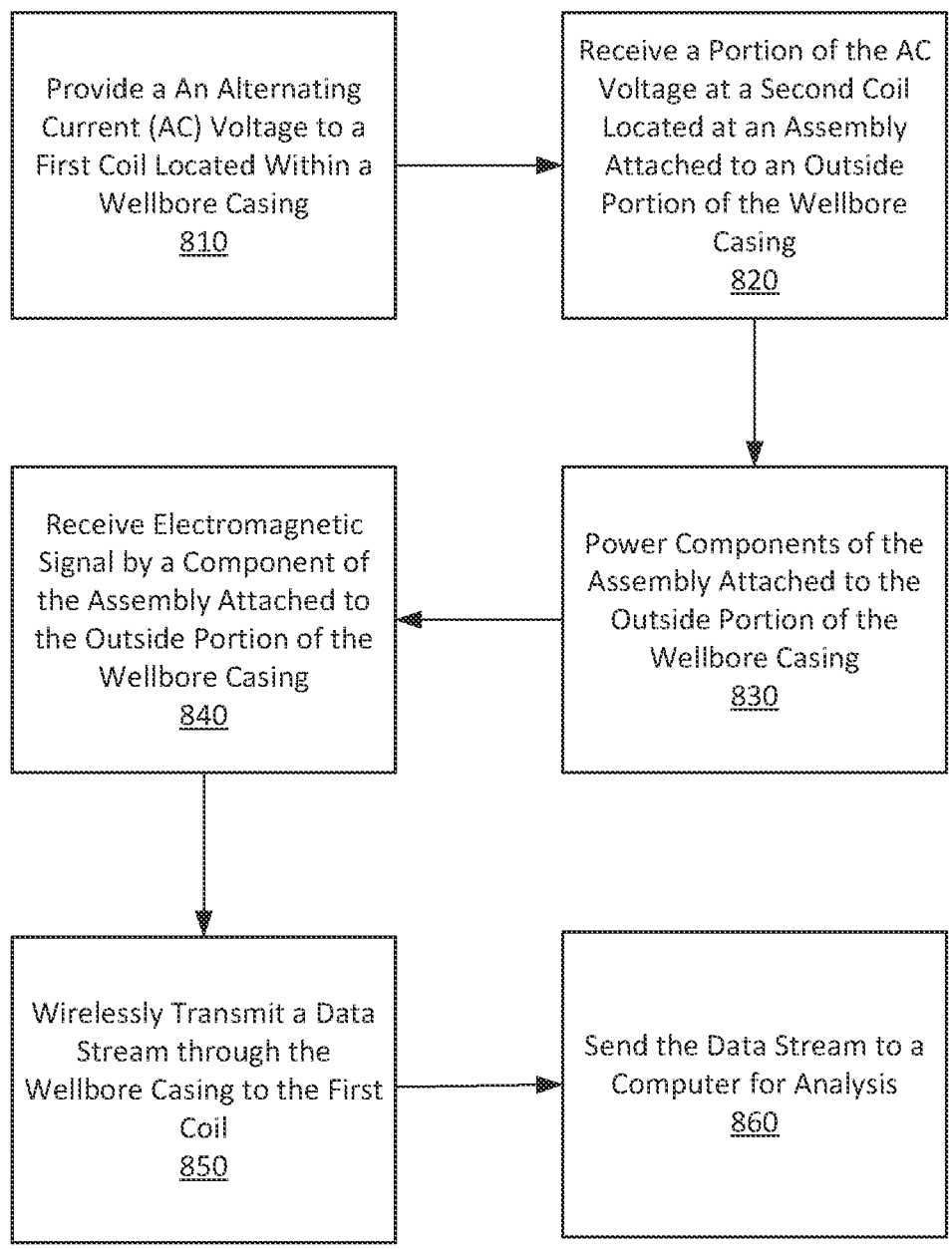
FIG. 8 is a flowchart illustrating an example process obtaining measurements describing conditions of an Earth formation, in accordance with various aspects of the subject technology.

FIG. 8 illustrates an example process for monitoring conditions of an Earth formation, according to some examples of the present disclosure. At block 810, the process can include providing an alternating current (AC) voltage to a first coil located on an inside portion of a wellbore casing. The coil that receives this AC voltage may include any of the inductors/coils 380 or 480 of FIGS. 3-4. At block 820, the process can include inductively coupling least a portion of the AC voltage provided to the first coil, through a wellbore casing to a second coil located at an assembly that is attached to an outside surface of the wellbore casing via electromagnetic, capacitive, piezoelectric, or galvanic action. At block 830, the process can include powering, using an AC voltage received by the second coil, components of the assembly attached to the outside surface of the wellbore casing. The first coil and the second coil can act as a transformer where electromagnetic induction is used to transfer energy from the first coil to the second coil. Energy received by the second coil may be used to power electronic assemblies attached to the outside portion of a wellbore casing whether or not a battery or other energy storage device is included in the assembly attached to the outside portion of the wellbore casing. Such assemblies may include components that rectify an AC voltage received by the second coil to covert the AC voltage into a DC voltage. Assemblies on the outside of the wellbore casing may include components that generate signals used to energize elements that may transmit electromagnetic energy into an Earth formation. This may include generating AC signals that power components that generate electromagnetic fields into the ground.

At block 840, the process can include receiving an EM signal by a component of the assembly that is attached to an outside surface of the wellbore casing. The EM signal may be received by one or more coils, such as the triaxial coils 340 discussed in respect to FIG. 3 or may be received by other types of sensors that sense electrical fields, magnetic fields, and/or electromagnetic fields. At block 850, the process can include wirelessly transmitting a data stream generated from (e.g., converted from the EM signal) the EM signal to components electrically coupled to the first coil. For example, the process can convert the EM signal to a data stream and wirelessly transmit the data stream to components electrically coupled to the first coil. In certain instances, the AC voltage inductively coupled between the first coil and the second coil may be coupled during a first time period and the data stream may be wirelessly transmitted to the first coil from the second coil during a second time period. At block 860, the process can include transmitting the data stream to a computer for analysis. As mentioned above, this analysis may identify that changes in resistivities of a wellbore correspond to a reservoir being filled with CO2 up to a point where the reservoir is filled to a maximum capacity. When the analysis identifies that the resistivities of Earth formations next to a reservoir are changing, a determination may be made that the reservoir has reached a maximum capacity. Alternatively or additionally, this analysis may identify how far a fracturing fluid is propagating into an Earth formation.

In certain instances, instead of a coil used to transmit power and/or data inductively, power and/or data may be transferred capacitively using capacitive contacts 580 and 560 of FIG. 5. In some cases, the data may be sent to the computer via a set of wires or a fiber optic cable. In other cases, the data may additionally or alternatively be sent to the computer wirelessly. When data is sent wirelessly to the computer and/or any other device uphole or downhole, the process can use electromagnetic signals, radio frequency signals, and/or acoustic signals to wirelessly transfer/transmit the data. Different sets of electronic components disposed inside of the wellbore casing may receive and retransmit data up the wellbore similar to the way a Wi-Fi repeater operates.

Figure 9:
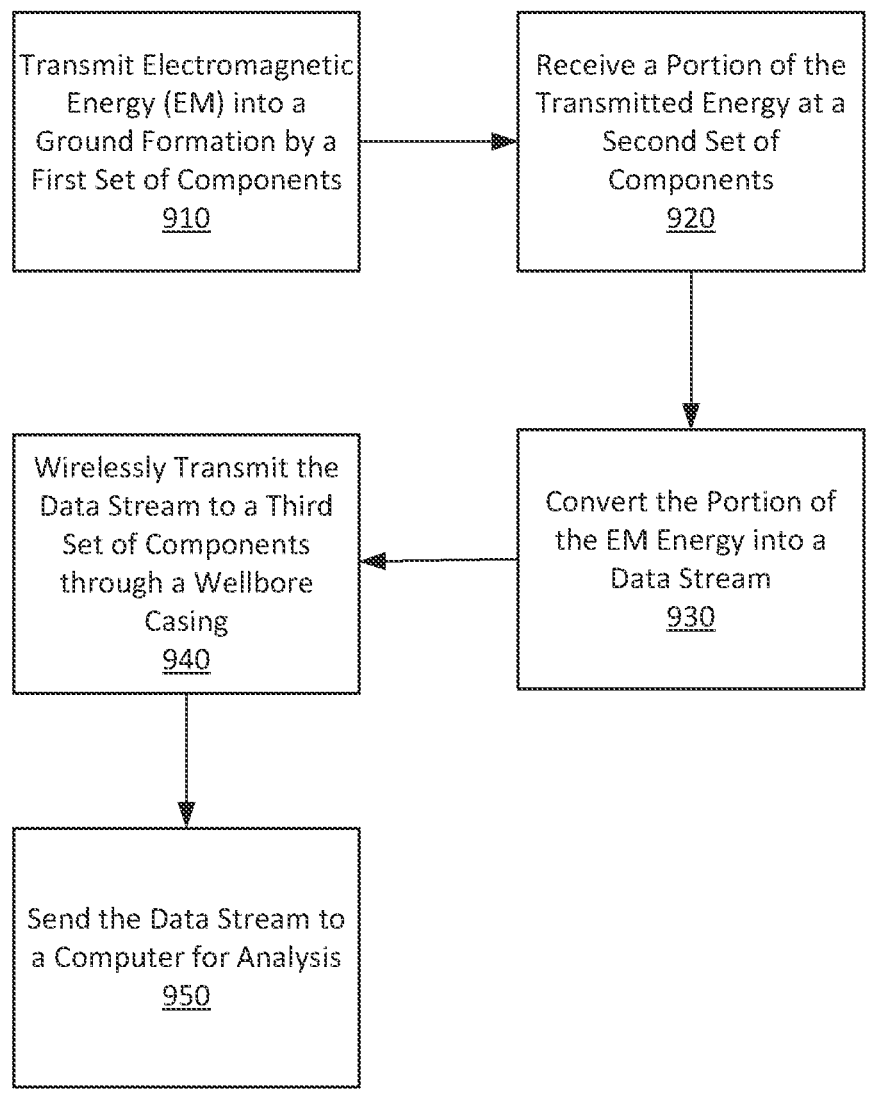
FIG. 9 is a flowchart illustrating an example process for monitoring a reservoir and conditions of an Earth formation, in accordance with various aspects of the subject technology.

FIG. 9 illustrates an example process for collecting data and assessing an Earth formation. In some examples, one or more of the example operations, steps, and/or actions discussed with respect to FIG. 9 may be performed when fluids, such as carbon dioxide (CO2), steam, water, and/or other fluids, are injected into an Earth formation. At block 910, the process can include transmitting, by one or more components, EM energy into a ground formation. In some cases, the energy can be transmitted from transmitters located at the surface of the Earth or transmitters located at a nearby wellbore that is different from a wellbore where a second set of components discussed below are located. At block 920, the process can include receiving a portion of the transmitted energy by a second set of components. The second set of components may include components located at the assembly discussed with respect to FIG. 8 or may include any of the components located on the outside surface of the wellbore discussed with respect to FIGS. 2-7.

At block 930, the process can include converting a portion of the received EM energy into a data stream. At block 940, the process can include wirelessly transmitting the data stream to a third set of components located within a casing of the wellbore. The components located within the wellbore may be attached to an outside surface of a tube placed within the wellbore. Here again, the data stream may be transmitted through the casing of the wellbore. At block 950, the process can include sending the data stream to a computer for analysis. As mentioned above, this analysis may identify that changes in resistivities of a wellbore correspond to a reservoir being filled with CO2 up to a point where the reservoir is filled to a maximum capacity. When the analysis identifies that the resistivities of Earth formations next to a reservoir are changing, a determination may be made that the reservoir has reached a maximum capacity. Alternatively or additionally this analysis may identify how far a fracturing fluid is propagating into an Earth formation.

In some cases, any of the actions performed in FIG. 9 may be combined with any of the actions discussed above with respect to FIG. 8. Because of this, the second set of components may be powered by energy coupled through the wellbore casing as discussed with respect to FIG. 8. In other instances, the second set of electronics may be powered by the EM energy received by the second set of components that was transmitted through the ground formation. Alternatively, acoustic energy may be transmitted for receipt by a piezoelectric device that is part of the second set of components. When acoustic power transfer is used, that acoustic energy may be transferred through the wellbore casing from the set of components located inside of the wellbore casing to the set of components located on the outside of the wellbore casing.

Figure 10:
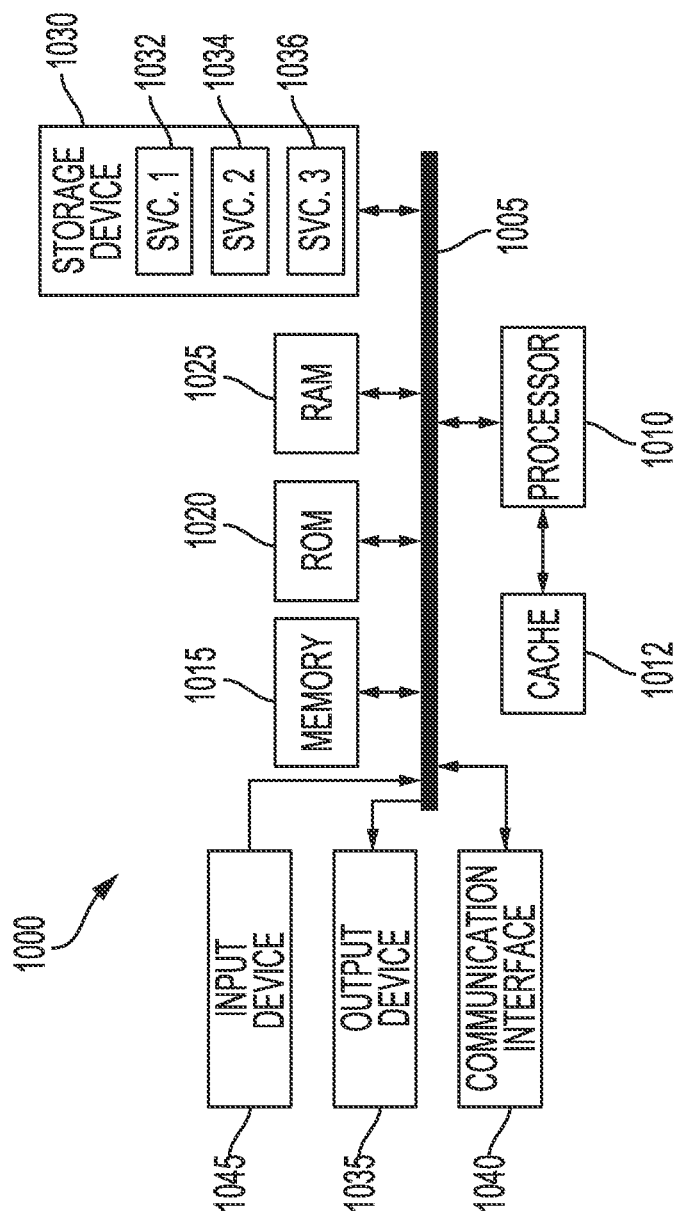
FIG. 10 illustrates an example computing device architecture which can be employed to perform various steps, methods, and techniques disclosed herein.

FIG. 10 illustrates an example computing device architecture 1000 which can be employed to perform any of the systems and techniques described herein. In some examples, the computing device architecture can be integrated with the electromagnetic imager tools described herein. Further, the computing device can be configured to implement the techniques of controlling borehole image blending through machine learning described herein.

The components of the computing device architecture 1000 are shown in electrical communication with each other using a connection 1005, such as a bus. The example computing device architecture 1000 includes a processing unit (CPU or processor) 1010 and a computing device connection 1005 that couples various computing device components including the computing device memory 1015, such as read only memory (ROM) 1020 and random access memory (RAM) 1025, to the processor 1010.

The computing device architecture 1000 can include a cache of high-speed memory connected directly with, in close proximity to, or integrated as part of the processor 1010. The computing device architecture 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other computing device memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the processor design. The processor 1010 may be a self-contained system, containing multiple cores or processors, a bus, memory controller, cache, etc. A multi-core processor may be symmetric or asymmetric.

To enable user interaction with the computing device architecture 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art, such as a display, projector, television, speaker device, etc. In some instances, multimodal computing devices can enable a user to provide multiple types of input to communicate with the computing device architecture 1000. The communications interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. The storage device 1030 can include services 1032, 1034, 1036 for controlling the processor 1010. Other hardware or software modules are contemplated. The storage device 1030 can be connected to the computing device connection 1005. In one aspect, a hardware module that performs a particular function can include the software component stored in a computer-readable medium in connection with the necessary hardware components, such as the processor 1010, connection 1005, output device 1035, and so forth, to carry out the function.

For clarity of explanation, in some instances the present technology may be presented as including individual functional blocks including functional blocks comprising devices, device components, steps or routines in a method implemented in software, or combinations of hardware and software.

In some instances, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples and aspects thereof, but those skilled in the art will recognize that the application is not limited thereto. Thus, while illustrative examples and aspects of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, examples and aspects of the systems and techniques described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Methods and apparatus of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Such methods may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. A system comprising a transmitting element that provides a first signal to a ground formation, and a receiving element that receives energy from the first signal transmitted into the ground formation by the transmitting element, wherein the received energy is converted into a second signal that is provided to a computer such that the computer can perform an evaluation on the second signal to identify a property of the ground formation. This system may also include a first contactless communication element located inside of a wellbore casing, a second contactless communication element located on an exterior surface of the wellbore casing that transmits the second signal to the first contactless communication element, and a communication interface coupled to the first contactless communication element over which the second signal is sent to the computer.

Aspect 2. The system of Aspect 1, further comprising one or more electronic components coupled to the receiving element that are powered by a voltage generated by stimulation of a piezoelectric device, inductive coupling, or capacitive coupling.

Aspect 3: The system of Aspect 2, wherein the voltage is generated from the energy received by the receiving element.

Aspect 4: The system of Aspect 2, wherein the voltage is generated based on contactless power transfer received from an electronic assembly that includes the first contactless communication element.

Aspect 5: The system of any of Aspects 1 to 4, wherein the transmitting element and the receiving element are located at a top surface of the ground formation.

Aspect 6, The system of any of Aspects 1 to 5, wherein the transmitting element transmits the first signal into the ground formation without direct electrical contact being made with the ground formation, and the receiving element receives the energy without making direct electrical contact with the ground formation.

Aspect 7. The system of any of Aspects 1 to 6, wherein the transmitting element and the receiving element include one or more respective inductors, the first signal is transmitted via an electromagnetic (EM) field, and the second signal is generated based on receiving the energy via EM induction.

Aspect 8. The system of any of Aspects 1 to 7, wherein the first signal is transmitted based on galvanic excitation and the energy is received via galvanic action.

Aspect 9: A method comprising transmitting electromagnetic (EM) energy into a ground formation via a first set of components, and receiving a portion of the transmitted EM energy by a second set of components, wherein the second set of components are located on an outside portion of a wellbore casing. This method may also include converting the portion of the EM energy received by the second set of components into a data stream by the second set of components located on the outside portion of the wellbore casing, and wirelessly transmitting the data stream through the wellbore casing to a third set of components, wherein the third set of components are located inside of the wellbore casing. The method may also include sending the data stream to a computer, wherein the computer performs an evaluation on the data stream to identify a property of the ground formation.

Aspect 10. The method of Aspect 9, further comprising wirelessly transmitting power from the third set of components through the wellbore casing to the second set of components.

Aspect 11. The method of Aspect 10, wherein the data stream is sent through the wellbore casing during a first time period and the power is sent through the wellbore casing during a second time period, wherein a voltage is generated from the energy received by the receiving element.

Aspect 12. The method of any of Aspects 9 to 11, wherein the first set of components are located at a top surface of the ground formation.

Aspect 13. The method of any of Aspects 9 to 12, wherein the first set of components are located at an outside portion of a second wellbore casing.

Aspect 14. The method of any of Aspects 9 to 13, wherein the first set of components includes a first inductor that transmits the EM energy into the ground formation and the second set of components includes a second inductor that receives the portion of the EM energy.

Aspect 15. The method of any of Aspects 9 to 14, wherein the EM energy is transmitted based on galvanic excitation.

Aspect 16. The method of Aspect 15, wherein the portion of the EM energy is received via galvanic action.

Aspect 17. A non-transitory computer-readable storage media having embodied thereon instructions that when executed by one or more processors result in: a transmission of a control signal that initiates electromagnetic (EM) energy being transmitted into a ground formation via a first set of components, a portion of the transmitted EM energy being received by a second set of components, wherein the second set of components are located on an outside portion of a wellbore casing. A portion of the EM energy may be received by the second set of components and that energy may be converted into a data stream by the second set of components located on the outside portion of the wellbore casing. The data stream may be wirelessly transmitted through the wellbore casing to a third set of components, wherein the third set of components are located inside of the wellbore casing. The data stream may be sent to a computer, wherein the computer performs an evaluation on the data stream to identify a property of the ground formation.

Aspect 18. The non-transitory computer-readable storage media of Aspect 17, wherein power is wirelessly transmitted from the third set of components through the wellbore casing to the second set of components.

Aspect 19. The non-transitory computer-readable storage media of Aspect 18, wherein the data stream is sent through the wellbore casing during a first time period and the power is sent through the wellbore casing during a second time period.

Aspect 20. The non-transitory computer-readable storage media of any of Aspects 17 to 19, wherein the first set of components includes a first inductor that transmits the EM energy into the ground formation and the second set of components includes a second inductor that receives the portion of the EM energy.

Aspect 21. A system comprising means for performing a method according to any of Aspects 9 to 16.

Aspect 22. A computer-program product comprising instructions which, when executed by one or more processors, cause the one or more processors to perform a method according to any of Aspects 9 to 16.

What is claimed is:
1. A system comprising:
a transmitting element that provides a first signal to a ground formation;
a receiving element that receives energy from the first signal transmitted into the ground formation by the transmitting element, wherein the received energy is converted into a second signal that includes data that is provided to a computer such that the computer can perform an evaluation to identify a property of the ground formation;
a first contactless communication element located inside of a wellbore casing configured to receive the second signal based on a tuned operating frequency that is selected based on either or both a number of layers of the casing and a thickness of the casing;
a second contactless communication element located on an exterior surface of the wellbore casing that transmits the second signal at the tuned operating frequency to the first contactless communication element, wherein the second signal is transmitted through the casing at the operating frequency associated with the casing; and
a communication interface coupled to the first contactless communication element over which the data included in the second signal is sent to the computer.

2. The system of claim 1, further comprising one or more electronic components coupled to the receiving element that are powered by a voltage generated by stimulation of a piezoelectric device, inductive coupling, or capacitive coupling.

3. The system of claim 2, wherein the voltage is generated from the energy received by the receiving element.

4. The system of claim 2, wherein the voltage is generated based on contactless power transfer received from an electronic assembly that includes the first contactless communication element.

5. The system of claim 1, wherein the transmitting element and the receiving element are located at a top surface of the ground formation.

6. The system of claim 1, wherein:
the transmitting element transmits the first signal into the ground formation without direct electrical contact being made with the ground formation,
the receiving element receives the energy without making the direct electrical contact with the ground formation, and
the operating frequency corresponds to one or more of the number of layers of the casing or the thickness of the casing.

7. The system of claim 1, wherein the transmitting element and the receiving element include one or more respective inductors, the first signal is transmitted via an electromagnetic (EM) field, and the second signal is generated based on receiving the energy via EM induction.

8. The system of claim 1, wherein the first signal is transmitted based on galvanic excitation and the energy is received via galvanic action.

9. A method comprising:
transmitting electromagnetic (EM) energy into a ground formation via a first set of components;
receiving a portion of the transmitted EM energy by a second set of components, wherein the second set of components are located on an outside portion of a wellbore casing;
converting the portion of the EM energy received by the second set of components into a signal that includes data by the second set of components located on the outside portion of the wellbore casing;
wirelessly transmitting the signal that includes the data through the wellbore casing to a third set of components based on the signal corresponding to a tuned operating frequency that is selected based on either or both a number of layers of the casing and a thickness of the casing, wherein the third set of components are located inside of the wellbore casing; and
sending the data to a computer, wherein the computer performs an evaluation on the data to identify a property of the ground formation.

10. The method of claim 9, further comprising:
wirelessly transmitting power from the third set of components through the wellbore casing to the second set of components.

11. The method of claim 10, wherein the signal is sent through the wellbore casing during a first time period and the power is sent through the wellbore casing during a second time period, and a voltage is generated from the portion of the transmitted EM energy received by the second set of components.

12. The method of claim 9, wherein the first set of components are located at a top surface of the ground formation.

13. The method of claim 9, wherein the first set of components are located at an outside portion of a second wellbore casing.

14. The method of claim 9, wherein the first set of components includes a first inductor that transmits the EM energy into the ground formation and the second set of components includes a second inductor that receives the portion of the transmitted EM energy.

15. The method of claim 9, wherein the EM energy is transmitted based on galvanic excitation.

16. The method of claim 15, wherein the portion of the transmitted EM energy is received via galvanic action.

17. A non-transitory computer-readable storage media having embodied thereon instructions that when executed by one or more processors result in:
a transmission of a control signal that initiates electromagnetic (EM) energy being transmitted into a ground formation via a first set of components:
a portion of the transmitted EM energy being received by a second set of components, wherein the second set of components are located on an outside portion of a wellbore casing;
the portion of the EM energy received by the second set of components being converted into a signal that includes data by the second set of components located on the outside portion of the wellbore casing;
wirelessly transmitting the signal that includes the data through the wellbore casing to a third set of components based on the signal that includes the data corresponding to a tuned operating frequency that is selected based on either or both a number of layers of the casing and a thickness of the casing, wherein the third set of components are located inside of the wellbore casing; and
the data being sent to a computer, wherein the computer performs an evaluation on the data to identify a property of the ground formation.

18. The non-transitory computer-readable storage media of claim 17, wherein:
power is wirelessly transmitted from the third set of components through the wellbore casing to the second set of components.

19. The non-transitory computer-readable storage media of claim 18, wherein the signal that includes the data is sent through the wellbore casing during a first time period and the power is sent through the wellbore casing during a second time period.

20. The non-transitory computer-readable storage media of claim 17, wherein the first set of components includes a first inductor that transmits the EM energy into the ground formation and the second set of components includes a second inductor that receives the portion of the transmitted EM energy.

* * * * *